United States Patent [19]

Chonde

[11] Patent Number: 4,614,751

[45] Date of Patent: Sep. 30, 1986

[54] PROCESS FOR PREPARING IMPROVED WEAK ACID RESINS AND POROUS WEAK ACID RESINS

[75] Inventor: Yohannes Chonde, Midland, Mich.

[73] Assignee: The Dow Chemical Company, Midland, Mich.

[21] Appl. No.: 695,648

[22] Filed: Jan. 28, 1985

Related U.S. Application Data

[63] Continuation-in-part of Ser. No. 596,885, Apr. 5, 1984, abandoned.

[51] Int. Cl.$^4$ .............................. C08D 5/20; C08F 8/12
[52] U.S. Cl. ........................................ 521/31; 525/369
[58] Field of Search ................ 521/31; 526/328.5; 525/369

[56] References Cited

U.S. PATENT DOCUMENTS 4,062,817 12/1977 Westerman ..................... 525/369
4,524,186 6/1985 Nagase ............................. 525/369

*Primary Examiner*—Joseph L. Schofer
*Assistant Examiner*—Peter F. Kulkosky

[57] ABSTRACT

Weak acid type cation exchange resins are prepared by subjecting to caustic hydrolysis a copolymer comprising in polymerized form a major amount of an acrylate monomer which is hydrolyzable under caustic conditions; a minor amount of an acrylate monomer which has a less hydrolyzable character than the hydrolyzable monomer, and an effective amount of a crosslinking monomer. For example, copolymers prepared from methyl acrylate, butyl acrylate and divinylbenzene. The resin beads so prepared exhibit increased resistance to osmotic shock.

18 Claims, No Drawings

PROCESS FOR PREPARING IMPROVED WEAK ACID RESINS AND POROUS WEAK ACID RESINS

REFERENCE TO RELATED APPLICATION

This is a continuation-in-part of U.S. patent application Ser. No. 596,885, filed Apr. 5, 1984, and now abandoned.

BACKGROUND OF THE INVENTION

The present invention relates to ion exchange resins, and in particular, to ion exchange resins which are acidic in character.

Weak acid resins have been prepared by suspension polymerizing and crosslinking unsaturated carboxylic acids such as acrylic acid. Unfortunately, the polymerization of unsaturated carboxylic acids is highly exothermic making reaction control very difficult. Thus, the physical properties of the final resin product are typically very poor in quality.

Weak acid resins have been prepared by the post-hydrolysis of suspension polymerized, crosslinked acrylic acid esters. Unfortunately, such a process provides resin products which have undergone incomplete hydrolysis and exhibit poor physical strengths. Thus, such resins can have low exchange capacities and low resistance to osmotic shock.

In view of the deficiencies of the prior art, it would be highly desirable to provide a weak acid ion exchange resin with a high operating capacity which can be prepared in a controlled manner and exhibits high resistance to osmotic shock during regeneration.

SUMMARY OF THE INVENTION

The present invention is a process for preparing weak acid type cation exchange resins by subjecting to caustic hydrolysis a copolymer comprising in polymerized form a major amount of a monomer which is hydrolyzable under caustic conditions; a minor amount of a monomer which has a less hydrolyzable character than the hydrolyzable monomer; and an effective amount of a crosslinking monomer; and optionally a minor amount of a non-hydrolyzable monomer. As used herein the term "hydrolysis" refers to caustic hydrolysis. The term "caustic" is to be broadly construed to mean a strongly basic species. In another aspect, the present invention is the weak acid type cation exchange resin which is prepared using the process as described hereinbefore.

The process of this invention provides the skilled artisan with a method for preparing weak acid type cation exchange resins exhibiting a high operating ion exchange capacity and improved osmotic shock properties. Resin beads of this invention can have a porous character, and in particular, a macroporous character. Such resin beads can be subjected to an increased number of regeneration cycles without a substantial amount of cracking of said resin beads. Such beads are useful in a wide variety of applications which can include the demineralization of water for enhanced oil recovery, the removal of heavy metal ions from various aqueous streams, and the like.

DETAILED DESCRIPTION OF THE INVENTION

Polymers useful in the practice of this invention are crosslinked polymers formed by the addition polymerization of at least one polymerizable hydrolyzable monoethylenically unsaturated monomer, at least one polymerizable monoethylenically unsaturated monomer which is less hydrolyzable in character than the hydrolyzable monomer, and at least one polymerizable unsaturated monomer capable of providing crosslinking to the polymer.

Hydrolyzable monomers useful herein generally include the alkyl acrylates, wherein alkyl can range from $C_1$ to about $C_3$, depending upon the degree or ease of hydrolysis which is desired. In general, any alkyl ester of acrylic acid, itaconic acid, etc., which is readily hydrolyzable under caustic conditions can be employed. Preferred alkyl acrylates include ethylacrylate, butylacrylate, hexylacrylate, and the like; with methylacrylate being especially preferred.

Non-hydrolyzable monomers which are optionally useful herein include, for example, acrylonitrile, styrene, ethylbenzene, vinyl toluene, methylstyrene, vinylbenzyl chloride, and halogenated styrene, heterocyclic aromatics such as vinylpyridine and substituted vinylpyridines, vinyl acetate, vinyl chloride, vinylidene chloride, N-vinylpyrirolidone, and methacrylates which are not highly hydrolyzable under conditions which the hydrolyzable monomers are converted to carboxylic acid moieties.

Monomers which are less hydrolyzable than the aforementioned hydrolyzable monomers include those alkylacrylates which contain an alkyl functionality which provides a less hydrolyzable character to the monomer than said hydrolyzable monomer. In particular, the less hydrolyzable monomer does not undergo hydrolysis to any substantial degree under conditions which the hydrolyzable monomer undergoes hydrolysis. Preferred less hydrolyzable monomers typically have alkyl functionalities which have higher amounts of carbon atoms than those hydrolyzable monomers. For example, if methylacrylate is the hydrolyzable monomer, then ethylacrylate or butylacrylate can be employed as the monomer which is less hydrolyzable in character. Similarly, if ethylacrylate is employed as the hydrolyzable monomer, then butylacrylate or hexylacrylate can be employed as the monomer which is less hydrolyzable in character.

Crosslinking monomers are those monomers which can introduce crosslinking to the resulting polymer. Examples of such monomers are those useful in preparing ion exchange resins and are those polyvinyl crosslinking monomers such as divinylbenzene, divinyltoluene, divinylxylene, and divinylnapthalene; ethylene glycol dimethacrylate; trimethylol propane triacrylate; divinylsuccinate; and the like. See, also, those disclosed in U.S. Pat. No. 4,419,245 and U.S. Pat. No. 4,444,961.

The monomer composition which is employed can vary depending upon factors such as the density of the bead desired, the amount of physical stability which is desired, the ion exchange capacity which is desired, and the like. Typically, the amount of hydrolyzable monomer can range from about 70 to about 90 weight percent; the amount of less hydrolyzable and optional non-hydrolyzable monomer can range from about 1 to about 20 weight percent; and the amount of crosslinking monomer can range from about 4 to about 12 weight percent based on all monomers. If desired, the hydrolyzable monomer portion can be polymerized in conjunction with a monomer such as acrylic acid.

The process of this invention is preferably performed by suspension polymerizing the aforementioned monomers under conditions such that polymerization occurs.

Suitable solvents, surfactants, diluents, activators and catalysts are known in the art. See, for example, U.S. Pat. No. 4,224,415. The resulting polymer product is isolated and subjected to hydrolysis conditions. For example, the polymer can be contacted with a hydroxide solution. The resin can be washed with an acid solution to yield the H-form resin. Beads can be obtained in a gel form or in a porous form.

While beads having a wide range of pore sizes can be employed, beads having pore sizes greater than 100 Å in diameter are preferred. That is, porous beads of this invention include the macroporous beads. Macroporous beads are those macroreticular types of beads as are defined in U.S. Pat. No. 4,224,415. For example, macroporous beads are prepared by those techniques described in U.S. Pat. No. 4,382,124, which is incorporated by reference.

The resin beads of this invention are preferably spherical beads having particle sizes ranging from about 180 to about 2,000 microns, preferably from about 200 to about 1,000 microns. The distribution of the particle size can be narrowed by employing the appropriate stabilizer. Narrow distributions of particle sizes can be obtained by using the method taught in U.S. Pat. No. 4,444,961; which is incorporated herein by reference.

The resins of this invention exhibit good osmotic shock resistance as well as high ion exchange capacity. It is believed that the copolymerization of the hydrolyzable monomer with the non-hydrolyzable monomer or less hydrolyzable monomer causes the crosslinking in the bead to be less centralized. The more even spread of crosslinking in the bead is believed to provide a stronger product which exhibits less potential to crack or break during repeated shrinking and swelling.

The following examples are presented to further illustrate but not limit the scope of this invention. All parts and percentages are by weight, unless otherwise noted.

EXAMPLE 1

Into a jacketed stainless steel reactor is charged an aqueous solution comprising 1,500 grams (g) distilled water, 2.4 g carboxymethyl methylcellulose and 2.7 g sodium dichromate. To this solution is charged an organic mixture containing 763 g methylacrylate, 105 g n-butylacrylate, 200 g divinylbenzene, 100 g isooctane diluent, 0.5 g tertiary butylperoctoate and 0.9 tertiary butyl perbenzoate. The reactor is purged with nitrogen for 15 minutes. The mixture is then agitated and the polymerization is conducted at 75° C. for 5 hours, followed by 110° C. for 3 hours. The reaction mixture is cooled. The spherical polymer product is filtered and washed with distilled water. The diluent is removed by steam distillation.

The polymer product is mixed with a 20 percent active aqueous sodium hydroxide solution at 100° C. for 5-6 hours. The polymer product is filtered and washed with 1 normal hydrochloric acid. The final resin exhibits a bulk density in the acid form of 0.83 g/ml. The wet volume of the resin is 4.5 meq/ml. The water retention capacity of the resin is 51.6 percent. The osmotic shock resistance of the sample is high. After 500 cycles of treatment of the resin beads with alternating 5 percent hydrochloride acid and 5 percent sodium hydroxide solutions, 100 percent of the beads are left whole. The operating capacity of the resin is 47 Kg/ft$^3$ of resin. Other properties of resins which are similarly prepared (designated as Sample No. 1) are presented in Table I.

TABLE I

| Sample | Wet Volume Capacity (meq/ml) | Water Retention Capacity (%) | Expansion[1] | Osmotic Shock (% whole bead) |
|---|---|---|---|---|
| 1 | 4.2 | 48.7 | 64 | 100 |
| C-1* | 3.32 | 51.2 | 90 | 70 |
| C-2* | 4.1 | 44 | 71 | 80 |

*Not an example of the invention.
C-1 and C-2 are commercially available macroporous resins. C-1 is a carboxylated macroporous resin comprising substantial amounts of polymerized methacrylate and is sold commercially as Amberlite DP-1 by Rohm and Haas Company. C-2 is a carboxylated macroporous resin comprising substantial amounts of polymerized methyl acrylate and is sold commercially as Dowex CCR-2E by The Dow Chemical Company.
[1]Expansion is percent expansion based on volume from sodium form of resin to acid form.

The data in Table I indicate that the sample of this invention (Sample No. 1) exhibits increased osmotic shock resistance as compared to commercially available macroporous resins. In addition, it is noted that Sample No. 1 has undergone 500 cycles of the treatment as described hereinbefore, while the comparative samples (i.e. Sample Nos. C-1 and C-2) have undergone only 100 cycles of treatment.

EXAMPLE 2

Into a reactor is charged an aqueous solution comprising 1496 g deionized water, 2.4 g carboxymethyl methylcellulose and 1.5 g sodium dichromate. To this solution is charged an organic mixture containing 150 g ethyl acrylate, 750 g methacrylate, 150 g of a 55 percent active divinylbenzene formulation, 340 g isooctane, 2.5 g tertiary butylperoctoate and 2.5 g tertiary butyl perbenzoate. The mixture is treated and reacted as in Example 1, hydrolyzed with a 20 percent active aqueous sodium hydroxide solution as described in Example 1, and filtered and washed with 1 normal hydrochloric acid. The sample is designated as Sample No. 2.

Into a reactor is charged an aqueous solution comprising 1496 g deionized water, 2.4 g carboxymethyl methylcellulose and 1.5 g sodium dichromate. To this solution is charged an organic mixture containing 105 g butyl acrylate, 663 g ethyl acrylate, 200 g of a 55 percent active divinylbenzene formulation, 100 g isooctane, 0.5 g tertiary butylperoctoate and 0.9 g tertiary butyl perbenzoate. The mixture is treated and reacted, hydrolyzed and washed as described hereinbefore. The sample is designated as Sample No. 3.

For comparison purposes is prepared a crosslinked ethyl acrylate copolymer which is hydrolyzed and which is designated as Sample No. C-3. Into a reactor is charged 1500 g of an aqueous solution as is described in Example 1. To this solution is charged an organic mixture containing 763 g ethyl acrylate, 200 g of a 55 percent active divinylbenzene formulation, 160 g isooctane, 0.5 tertiary butyl perbenzoate and 0.9 g tertiary butyl peroctoate. The mixture is treated and reacted, hydrolyzed and washed as described in Example 1.

For comparison purposes is prepared a crosslinked butylacrylate copolymer which is hydrolyzed and which is designated as Sample No. C-4. Into a reactor is charged 1500 g of an aqueous solution as is described in Example 1. To this solution is charged an organic mixture containing 763 g butyl acrylate, 200 g of a 55 percent active divinylbenzene formulation, 100 g isooctane, 0.5 g tertiary butyl peroctoate and 0.9 g tertiary butyl perbenzoate. The mixture is treated and reacted, hydrolyzed and washed as described in Example 1.

For comparison purposes is prepared a crosslinked methyl acrylate copolymer which is hydrolyzed and which is designated as Sample No. C-5. Into a reactor is charged 1,500 g of an aqueous solution as described in Example 1. To this is charged an organic mixture containing 763 g methyl acrylate, 126 g of a 55 percent active divinylbenzene formulation, 100 g isooctane and catalyst. The mixture is treated and reacted hydrolyzed and washed as described in Example 1.

Data for the Samples of this Example are presented in Table II.

TABLE II

| Sample | Wet Volume Capacity (meq/ml) | Water Retention Capacity (Percent) | Osmotic Shock Percent Whole Bead |
|---|---|---|---|
| 2 | 3.0 | 42 | 97 |
| 3 | 3.2 | 44 | 98 |
| C-3* | 3.5 | 42 | 69 |
| C-4* | 2.0 | 26 | 0 |
| C-5* | 4.0 | 50 | <20 |

*Not an example of the invention.

The data in Table II indicate that the samples of this invention (i.e., Sample Nos. 2 and 3) exhibit increased osmotic shock resistance as compared to the comparative samples.

What is claimed is:

1. A process for preparing weak acid type cation exchange resins by subjecting to caustic hydrolysis a copolymer comprising in polymerized form (1) a major amount ranging from about 70 to about 90 weight percent of an alkyl acrylate monomer which is hydrolyzable under caustic conditions, (2) a minor amount ranging from about 1 to about 20 weight percent of an alkyl acrylate monomer which has a less hydrolyzable character than the hydrolyzable monomer, and (3) an effective amount of a crosslinking monomer thereby producing cation exchange resin which exhibits improved resistance to osmotic shock.

2. A process of claim 1 wherein said weak acid type cation exchange resin has a porous character.

3. A process of claim 1 wherein the acrylate monomer, which is hydrolyzable, is an alkyl ester of acrylic acid which contains an alkyl functionality which contains less carbon atoms than the acrylate monomer having a less hydrolyzable character.

4. A process of claim 1 wherein said acrylate monomer, which is hydrolyzable, is an alkyl acrylate, wherein the alkyl can range from $C_1$ to about $C_3$.

5. A product prepared by the process of claim 1.

6. A process of claim 2 wherein the acrylate monomer, which is hydrolyzable, is an alkyl ester of acrylic acid which contains an alkyl functionality which contains less carbon atoms than the acrylate monomer having a less hydrolyzable character.

7. A process of claim 2 wherein said acrylate monomer, which is hydrolyzable, is an alkyl acrylate, wherein the alkyl can range from $C_1$ to about $C_3$.

8. A product prepared by the process of claim 2.

9. A process of claim 2 wherein said weak acid type cation exchange resin has a macroporous character.

10. A process of claim 9 wherein the acrylate monomer, which is hydrolyzable, is an alkyl ester of acrylic acid which contains an alkyl functionality which contains less carbon atoms than the acrylate monomer having a less hydrolyzable character.

11. A process of claim 9 wherein said acrylate monomer, which is hydrolyzable, is an alkyl acrylate, wherein the alkyl can range from $C_1$ to about $C_3$.

12. A product prepared by the process of claim 9.

13. A process of claim 1 wherein said monomer which is the major amount of monomer is methyl acrylate and said monomer which is the minor amount of monomer is butyl acrylate.

14. A process of claim 1 wherein said monomer which is the major amount of monomer is methyl acrylate and said monomer which is the minor amount of monomer is ethyl acrylate.

15. A process of claim 1 wherein said monomer which is the major amount of monomer is ethyl acrylate and said monomer which is the minor amount of monomer is butyl acrylate.

16. A process of claim 1 wherein said crosslinking monomer is a polyvinyl crosslinking monomer.

17. A process of claim 2 wherein said crosslinking monomer is a polyvinyl crosslinking monomer.

18. A process of claim 9 wherein said crosslinking monomer is a polyvinyl crosslinking monomer.

* * * * *